(12) United States Patent
Lapujade

(10) Patent No.: US 10,053,231 B2
(45) Date of Patent: Aug. 21, 2018

(54) INTEGRATION OF AIRCRAFT EXTERIOR LIGHTING WITH PROXIMITY SENSING AND WARNING

(71) Applicant: Goodrich Lighting Systems, Inc., Phoenix, AZ (US)

(72) Inventor: Philippe Lapujade, Chandler, AZ (US)

(73) Assignee: GOODRICH LIGHTING SYSTEMS, INC., Phoenix, AZ (US)

( * ) Notice: Subject to any disclaimer, the term of this patent is extended or adjusted under 35 U.S.C. 154(b) by 295 days.

(21) Appl. No.: 14/887,540

(22) Filed: Oct. 20, 2015

(65) Prior Publication Data

US 2017/0106999 A1 Apr. 20, 2017

(51) Int. Cl.
| | |
|---|---|
| B64F 1/00 | (2006.01) |
| B64D 47/02 | (2006.01) |
| G01S 17/93 | (2006.01) |
| G01S 7/486 | (2006.01) |
| G01S 17/10 | (2006.01) |
| G01S 17/00 | (2006.01) |
| G01S 17/46 | (2006.01) |

(52) U.S. Cl.
CPC .............. B64F 1/002 (2013.01); B64D 47/02 (2013.01); G01S 7/4861 (2013.01); G01S 17/003 (2013.01); G01S 17/10 (2013.01); G01S 17/46 (2013.01); G01S 17/933 (2013.01); B64D 2205/00 (2013.01)

(58) Field of Classification Search
CPC ....... B64D 47/04; B64D 47/06; G01S 17/026; G01S 17/42; H05B 33/0854; H05B 37/0227
See application file for complete search history.

(56) References Cited

U.S. PATENT DOCUMENTS

| | | | |
|---|---|---|---|
| 6,963,293 B1 | 11/2005 | Rast | |
| 2009/0164122 A1 | 6/2009 | Morbey et al. | |
| 2013/0110323 A1 | 5/2013 | Knight | |
| 2014/0062756 A1 | 3/2014 | Lamkin et al. | |
| 2016/0345408 A1* | 11/2016 | Schoen | B64D 47/04 |

FOREIGN PATENT DOCUMENTS

| | | |
|---|---|---|
| EP | 2026097 A1 | 2/2009 |
| EP | 2669705 A2 | 12/2013 |
| EP | 3095710 A1 | 11/2016 |
| WO | 02056054 A2 | 7/2002 |

OTHER PUBLICATIONS

Extended European Search Report for International Application No. 16194789.0 dated Mar. 7, 2017, 8 pages.

* cited by examiner

*Primary Examiner* — Luke D Ratcliffe
(74) *Attorney, Agent, or Firm* — Cantor Colburn LLP

(57) ABSTRACT

A system and method for estimating a distance between an aircraft and an object is disclosed. An exterior light of the aircraft transmit a test light signal and a parameter the transmitted test light signal is measured. A sensor receives a reflection of the test light signal from the object and the parameter is measured for the reflection test signal. The distance between the aircraft and the object is estimated using the parameter of the reflection and the parameter of the test light signal. The exterior light is generally a light that is built into the aircraft during aircraft construction while the sensor is retrofitted onto the aircraft.

14 Claims, 2 Drawing Sheets

_(1)_

INTEGRATION OF AIRCRAFT EXTERIOR LIGHTING WITH PROXIMITY SENSING AND WARNING

BACKGROUND OF THE INVENTION

A common concern of pilots that are taxiing an aircraft along the ground is that the aircraft does not collide with another object on the ground. As larger airplanes are being produced with larger wingspans, it becomes more difficult for the pilot to have a feel for the width of the aircraft. Thus, various incidents have occurred in which the tips of wings are run into objects on the ground, leading to unwanted expenses due to structural damage, flight delays and rescheduling of passengers.

BRIEF DESCRIPTION OF THE INVENTION

In one aspect of the present invention, a method of estimating a distance between an aircraft and an object includes: using an exterior light of the aircraft to transmit a test light signal; measuring a parameter of the transmitted test light signal; receiving at a sensor a reflection of the test light signal from the object; measuring the parameter of the reflection; and estimating the distance between the aircraft and the object using the parameter of the reflection and the parameter of the test light signal.

In another aspect of the present invention, a system for estimating a distance of an object to an aircraft includes: an exterior light of the aircraft; a sensor for sensing a parameter of incoming light; and a processor configured to: activate the exterior light to transmit a test light signal, measure a parameter of the test light signal, measuring the parameter for a reflection of the test light signal from the object received at the sensor, and estimate from the parameter of the received light and the parameter of the transmitted light the distance of the object to the aircraft.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
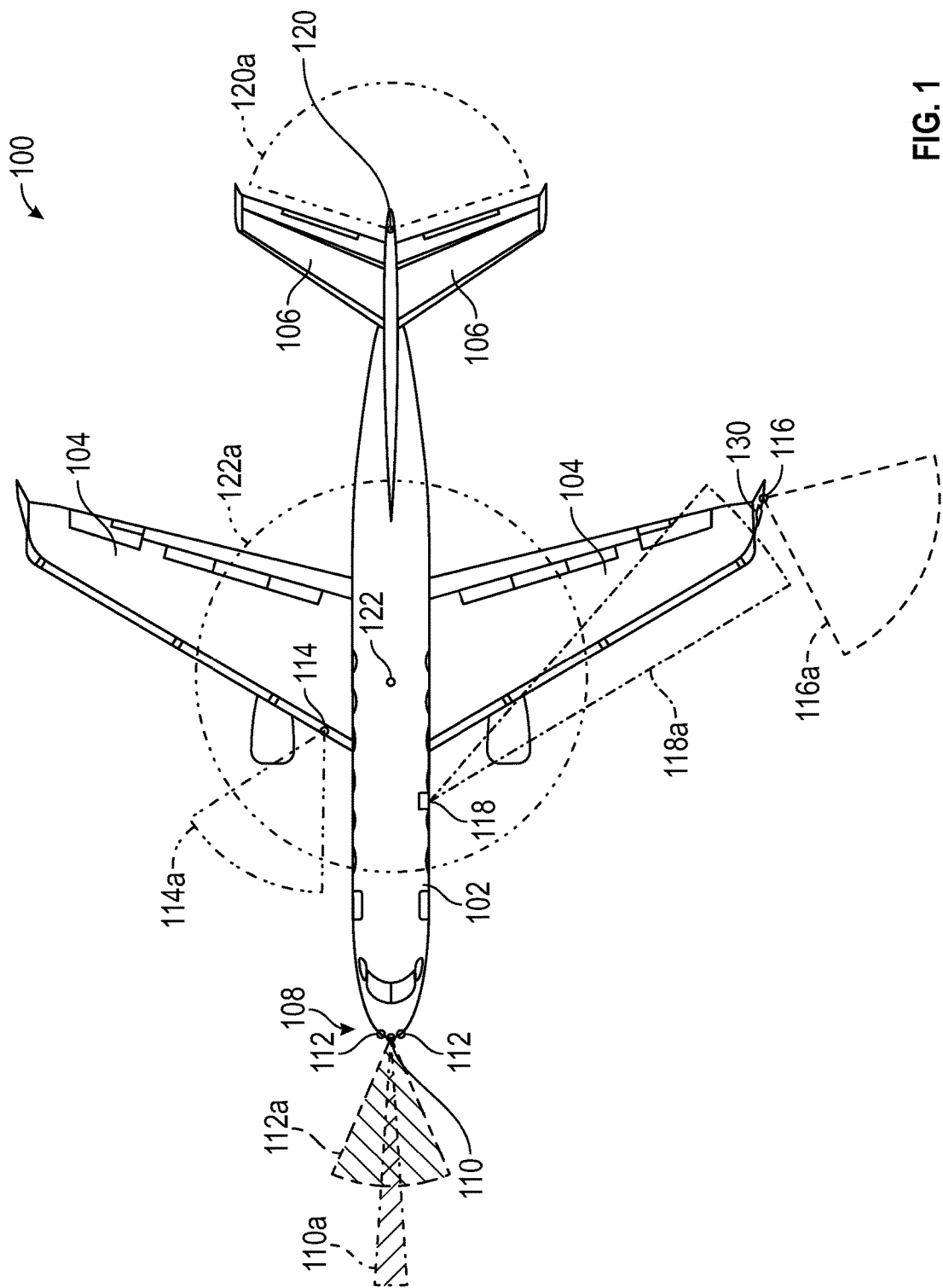
FIG. 1 shows a top view of an aircraft having a proximity sensing system for sensing proximity of an object to the aircraft in one embodiment of the present invention.

FIG. 1 shows a top view of an aircraft 100 having a proximity sensing system in one embodiment of the present invention. Aircraft 100 includes a fuselage 102 with forward wings 104 and aft wings 106. The aircraft 100 further includes various exterior lights at various locations. These exterior lights may be implemented on the aircraft 100 or built into the aircraft 100 during construction of the aircraft 100. The exterior lights are generally used for illumination purposes, for example, to provide lighting for the aircraft 100 either in-flight or during taxiing of the aircraft 100 along the ground. While taxiing, the exterior lights can be used to illuminate objects of the runway so that the pilot may see what is ahead of and around the aircraft 100. Also, the exterior lights can provide illumination of the aircraft 100 to other aircrafts in its vicinity so that other pilots can note its presence. Exemplary exterior lights include landing/take off light 110, taxi light 112, runway turn off light 114, wingtip position light 116, wing illumination lights 118, aft position lights 120, and/or an anti-collision/beacon light 122. Each of these exterior lights can have a related sensor for sensing a reflection of light from the exterior lights off of a foreign object. The sensors are generally retrofitted onto the aircraft 100 and are generally in relative proximity of the exterior light.

Landing/take off light 110 and taxi light 112 are generally provided on a nose 108 of the aircraft 100 and are generally used for illuminating or lighting a path in front of the aircraft 100. The landing/take off light 110 generally illuminates an area 110a concentrated within a relatively small solid angle and which extends a relatively long distance ahead of the nose 108. Taxi light 112 illuminates an area 112a having a larger solid angle that area 110a and extends a relatively shorter distance ahead of nose 108 in comparison to area 110a. In various embodiments, landing/take off light 110 and taxi light 112 are broadband white light sources providing light at least over the visible spectrum.

Runway turn off lights 114 are generally located on a leading edge of a wing 104 near the fuselage 102 and illuminate an area 114a in front of the wing 104 to allow the pilot to see on either side of the aircraft 100. For illustrative purposes only, the runway turn off light 114 is shown only on the wing 104 on the right side of the aircraft 100. However, runway turn off lights 114 are generally found on both wings 104. A sensor (not shown) associated with the runway turn off light 114 can collect reflected light from objects in close proximity to the wing 104.

Wingtip position lights 116 are generally located at a tip of the wing 104, i.e., the part of the wing 104 that is most distal from the fuselage 102. For illustrative purposes only, the wingtip position light 116 is shown only on the wing 104 on the left side of the aircraft 100. In general, wingtip position lights 116 are found on each of the wings 104. The wingtip position light 116 illuminates an area 116a that extends about 110 degrees in the horizontal plane, and about 180 degrees in the vertical plane. In one embodiment, a sensor 130 associated with the wingtip position light 116 collects reflected light in an area that extends about 110 degrees horizontal and a few degrees vertically. In various embodiments, the associated sensor is in close proximity of the wingtip position light 116. For example, the sensor 130 can also be located at the tip of the wing 104 alongside the wingtip position light 116.

A wing illumination light 118 is generally located on a side of the fuselage 102 and illuminates an area 118a that is directed over the leading edge of the wing 104. For illustrative purposes only, the wing illumination light 118 is shown on the left side of the fuselage 102. Generally, a wing illumination light 118 is found on both sides of the fuselage 102. A sensor (not shown) associated with the wing illumination light 118 can collect reflected light from objects in close proximity to the wing 104.

Aft position lights 120 are generally located at the tail of the aircraft 100 and emit behind the aircraft 100. The aft position lights 120 illuminate an area 120a that extends over about 140 degrees in the horizontal plane and about 180 degrees in the vertical plane. A sensor (not shown) associated with the aft position lights 120 can collect reflected light in a 140 degrees horizontal and a few degrees vertically.

Anti-collision/beacon light 122 is generally located atop the fuselage 102 and illuminates an area 122a that extends over 360 degrees in the horizontal plane, and up to about 150 degrees in the vertical plane. A sensor (not shown) associated with the anti-collision/beacon light 122 can collect reflected light in a 360 degrees horizontal and a few degrees vertically.

In general, sensors (such as sensor 130) can be retrofitted onto the airplane alongside exterior lights with which they are associated. A control unit (210, FIG. 2) may be employed to operate a selected exterior light and its corresponding sensor in order to determine a distance to between the object and the exterior light. By extension, the control unit can determine the distance between the object and the aircraft 100. A system for proximity detection is discussed in detail below with respect to FIG. 2.

Figure 2:
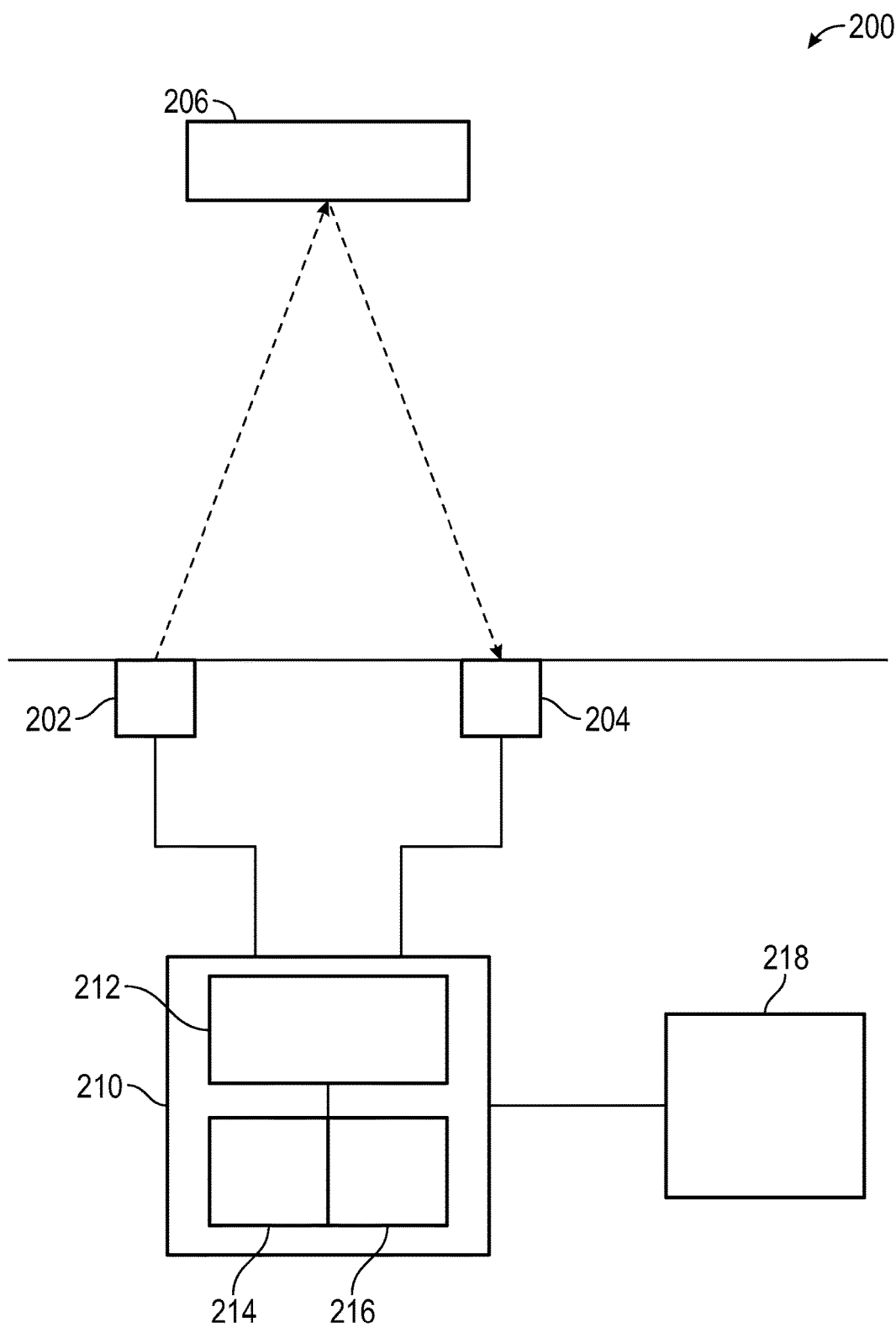
FIG. 2 shows a schematic diagram of the proximity sensing system, in one embodiment.

FIG. 2 shows a schematic diagram of the system 200 for sensing proximity of an object to the aircraft 100 in one embodiment. The system 200 includes a transmitter 202 for transmitting a light signal in the visible spectrum and a sensor or receiver 204 for receiving an incoming light signal. The transmitter 202 and receiver 204 are located on a plane section 220. In various embodiments, the transmitter 202 is one of the exterior lights (e.g., landing/take off light 110, taxi light 112, runway turn off light 114, wingtip position light 116, wing illumination lights 118, aft position lights 120, and/or an anti-collision/beacon light 122) discussed herein which are already installed on the aircraft 100 for a purpose other than proximity sensing. The transmitter 202 can be a broadband white light source or can be a light source that emits within a selected wavelength range. In various embodiments, the transmitter 202 is a light-emitting diode (LED) light source. The LED may emit light over a selected wavelength range. In one embodiment, the LED emits a green light in a range from about 500 nanometers (nm) to about 540 nanometers. In another embodiment, the LED emits a red light at about 617 nm. For a selected transmitter 202, the corresponding receiver 204 is generally tuned to a wavelength of the transmitter 202.

A control unit 210 is in communication with the transmitter 202 and the receiver 204. The control unit 210 includes a processor 212 and a computer-readable storage medium 214, such as a solid state storage medium. The storage medium 214 includes one or more programs 216 that when read by the processor 212 causes the processor 212 to perform the methods disclosed herein for determining a distance between an object 206 and the aircraft 100.

The control unit 210 controls an activation of the transmitter 202 and receives signals from the receiver 204. In one embodiment, the control unit 210 activates the transmitter 202 to emit a test signal. The test signal can be a test light signal such as beam of light. In one embodiment, the test light signal is a signal having a calibrated or known optical parameter, such as a known amplitude or intensity. An object 206 in the path of the transmitted beam of light reflects the light to form a reflected beam of light. The reflected beam of light is received at the receiver 204. A difference between the parameter of the transmitted light and the parameter of the received light is then used at the control unit 210 to determine a distance between the object 206 and the aircraft 100.

In one embodiment, the processor 212 records a transmission time at which the transmitter 202 emits the test light signal and records a reception time at which the reflected light is received at the receiver 204. A difference between the transmission time and the reception time, along with a known speed of light can be used to determine the distance between the object 206 and the aircraft 100.

In another embodiment the processor 212 records an amplitude or intensity of the test light signal and an amplitude or intensity of the reflected light. A difference between the amplitudes/intensities can be used along with the known inverse square law to determine the distance between the object 206 and the aircraft 100.

In various embodiments discussed above, the test light signal can be a short pulse of light. Alternatively, the test light signal can be a beam of light that has a long duration or can be a series of short pulses of light. For example, a series of short pulses can be transmitted and distances can be determined using each of the short pulses. The multiple distances can be observed over time to determine that the object is either approaching or receding from the aircraft 100. In another example, the amplitude of a reflected light can be measured for a test light signal over time. The change in the amplitude can be reflective of the approach of the object to the aircraft 100. Similar measurements over time can be performed using a single test light signal having a long duration.

In one embodiment, the control unit 210 sends a warning signal to a display 218 when the object 206 is within a selected range that may be considered "too close" to the aircraft 100 or when the speed of approach of the object 206 toward the aircraft 100 is considered "too fast" or requiring of evasive action. The display 218 is generally located in a cockpit of the aircraft 100. The display 218 can provide an audio signal or a warning light to the pilot. In one embodiment, the warning light can flash at a high rate when the object is detected, so as to capture the attention of the pilot.

The test light signal may be identified to the processor 212 by an encoded message transmitted along with the test light signal. For example, the transmitter 202 may be turned on and off or otherwise operated to produce the encoded message as a pattern of light fluctuations that can be recognized at the processor 212. The receiver 204 may read the pattern from the reflected light to verify that the incoming signal is indeed related to the transmitted signal. The message that is used to verify the test light signal can be provided immediately prior to the test light signal, immediately after the test light signal or during the test light signal as an integral part of the test light signal.

In various embodiments, the pattern related to the test light signal can be produced using pulse width modulation (PWM) methods or other modulation methods. Such modulation methods not only help to identify the test light signal but also aid in removal of background noise when performing calculations to estimate distances. In another embodiment, the sensitive wavelengths of the receiver 204 can be spectrally matched to its corresponding transmitter 202. For example, the receiver 204 can be sensitive in a "red" range (e.g., 617 nm) or a "green" range (e.g., from about 500 nm to about 540 nm) depending on the range of its corresponding transmitter 202. In one embodiment, a spectral filter may be includes as part of the receiver 204. The spectral filter can filter light within a range of wavelength corresponding to the range of wavelengths of its corresponding transmitter 202.

In the illustrative embodiment of FIG. 2, the transmitter 202 is shown to be in relative proximity to the receiver 204. However in alternate embodiments, the receiver 204 may be placed at a different location of the aircraft 100 so that light reflected from the object 206 away from the transmitter 202 and toward the different location of the aircraft 100 can be used to determine the location of the object 206 to the aircraft 100.

In one embodiment, the transmitter 202 (i.e., any of the exterior lights, such as landing/take off light 110, taxi light 112, runway turn off light 114, wingtip position light 116, wing illumination lights 118, aft position lights 120, and/or an anti-collision/beacon light 122) are disposed on the aircraft 100 during a manufacturing process of the aircraft 100 while the receiver 204 and processor 212 and/or control unit 210 are retrofitted into the aircraft 100 at a time after the manufacturing process. In another embodiment, the receiver 204 and processor 212 and/or control unit 210 are an integral part of the exterior light, so that the exterior light is manufactured having transmitter 202, receiver 204 and processor 212 and/or control unit 210.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of estimating a distance between an aircraft and an object, comprising:
    using an exterior light of the aircraft to transmit a test light signal, wherein the exterior light is a light previously provided on the aircraft for a purpose other than distance determination:
    measuring a parameter of the transmitted test light signal;
    receiving at a sensor a reflection of the test light signal from the object, wherein the sensor is retrofitted onto the aircraft;
    measuring the parameter of the reflection; and
    estimating the distance between the aircraft and the object using the parameter of the reflection and the parameter of the test light signal.

2. The method of claim 1, wherein using the exterior light includes using at least one of: (i) a landing/take off light; (ii) a runway illumination light; (iii) a wing illumination light; (iv) a wingtip position light; and (v) an aft position light.

3. The method of claim 1 further comprising transmitting a message identifying the test light signal along with the test light signal.

4. The method of claim 2, further comprising transmitting the associated message at one of: immediately prior to the test light signal, after the test light signal and as an integral part of the test light signal.

5. The method of claim 2, wherein the parameter is at least one of: (i) an amplitude of the reflected signal; and (ii) a time-of-flight of the reflected signal.

6. The method of claim 5, further comprising determining the change of the parameter over a selected time period to determine an approach of the object toward the aircraft.

7. The method of claim 1, wherein the exterior light is a light emitting diode.

8. The method of claim 1, wherein a wavelength of the test light signal is one of:
    (i) in a range from about 500 nanometers to about 540 nanometers; and (ii) at about 617 nanometers.

9. A system for estimating a distance of an object to an aircraft, comprising:
    an exterior light of the aircraft, wherein the exterior light is a light previously provided on the aircraft for a purpose other than distance determination:
    a sensor for sensing a parameter of incoming light, wherein the sensor is retrofitted onto the aircraft; and
    a processor configured to:
    activate the exterior light to transmit a test light signal, measure a parameter of the test light signal,
    measuring the parameter for a reflection of the test light signal from the object received at the sensor, and estimate from the parameter of the received light and the parameter of the transmitted light the distance of the object to the aircraft.

10. The system of claim 9, the exterior light of the aircraft includes is at least one of: (i) a landing/take off light; (ii) a runway illumination light; (iii) a wing illumination light; (iv) a wingtip position light; and (v) an aft position light.

11. The system of claim 9, wherein the processor activates the exterior light to transmit a message identifying the test light signal.

12. The system of claim 11, further comprising transmitting the associated message at one of: immediately prior to the test light signal, after the test light signal and as an integral part of the test light signal.

13. The system of claim 9, wherein at least one of the sensor and the processor are an integrated part of the exterior light.

14. The system of claim 9, wherein at least one of the sensor and the processor are an integrated part of the exterior light.

* * * * *